(12) United States Patent
Wilson

(10) Patent No.: US 6,341,617 B1
(45) Date of Patent: Jan. 29, 2002

(54) TAPS

(75) Inventor: John A. Wilson, London (GB)

(73) Assignee: Barber Wilsons & Company Limited (GB)

(*) Notice: Subject to any disclaimer, the term of this patent is extended or adjusted under 35 U.S.C. 154(b) by 0 days.

(21) Appl. No.: 09/636,358

(22) Filed: Aug. 11, 2000

(30) Foreign Application Priority Data

Apr. 6, 2000 (GB) .............................................. 0008524

(51) Int. Cl.⁷ .............................................. F16K 11/00
(52) U.S. Cl. .................................. 137/119.04; 137/359
(58) Field of Search ........................... 137/359, 119.03, 137/119.04

(56) References Cited

U.S. PATENT DOCUMENTS

| | | | |
|---|---|---|---|
| 2,769,454 A | * | 11/1956 | Bletcher |
| 3,052,257 A | * | 9/1962 | Bartlett |
| 4,429,422 A | | 2/1984 | Wareham |
| 5,232,008 A | * | 8/1993 | Jeffress et al. ................ 137/15 |
| 5,778,921 A | * | 7/1998 | Ko ......................... 137/119.04 |
| 5,881,754 A | * | 3/1999 | Wei ........................ 137/119.04 |

FOREIGN PATENT DOCUMENTS

| | | |
|---|---|---|
| EP | 0775860 | 5/1997 |
| GB | 654527 | 6/1951 |

\* cited by examiner

*Primary Examiner*—Stephen M. Hepperle
(74) *Attorney, Agent, or Firm*—Clifford A. Poff

(57) ABSTRACT

A water mixer for a sink, the water mixer comprising a mixing chamber having a hot water tap pillar and cold water tap pillar for controlling a supply of hot and cold water to respective inlets of a mixing chamber. Outlets from the mixing chamber supply water to the hollow interiors of the hot and cold water tap pillars which are interconnected by a mixer conduit joined with a nozzle for discharging water to the sink. The mixing chamber is provided with a shuttle valve formed by a truncated conical poppet valve receivable in a valve seat in response to water pressure from hot and or cold mixing chamber acting of a plate member connected by shaft to the poppet valve. The pressure on the plate develops when a spray head valve is operated to cause a flow of water from the mixing chamber to the spray head.

4 Claims, 2 Drawing Sheets

TAPS

BACKGROUND OF THE INVENTION

1. Field of the Invention

The present invention relates to taps for controlling hot and cold water supplies and, in particular, to improvements to a tap arrangement having a hot and cold water mixing assembly and in addition to a hot water tap and a cold water tap, a manually operable spray nozzle carried at the end of a flexible hose for controlling the discharge of water.

2. Description of the Prior Art

The tap arrangement of the present invention is particularly useful, for example, in twin-sink units in kitchens, where a manually operable spray nozzle is operated to direct the water spray for preliminary cleansing of kitchen ware in one sink before the ware is transferred to the other sink for a final washing. While there has been a trend in modern kitchens for concealing taps and associated fittings from continuous view so far as possible and for the appearance of such parts as are visible to be made as simple and "streamlined" as possible, there is, nonetheless, a demand for tap fittings of more traditional or "period" appearance. One aspect of the above-noted demand is a demand for a hot and cold water tap/mixer assembly of the kind illustrated in FIG. 1 mounted in a horizontal panel 10 and comprising a pillar sink mixer 12 having a cold tap pillar 14 and a hot tap pillar 16 in spaced-apart relationship with the exposed bodies of the two taps being connected by a simple tubular conduit 18. From the middle of the conduit there extends a unitary single swan-neck outlet 22, generally in the form of a loop of inverted J-shape. The pillar sink mixer is mounted to the horizontal panel 10 at a site so that the swan neck outlet is positioned over a sink 15 to discharge into the sink hot and cold water and the mixture thereof, the proportions of the mixture being determined by the settings of the taps. Such an arrangement is herein referred to, for convenience, as a pillar sink mixer.

A problem exists with the traditional form of a pillar sink mixer in that it has been impossible, or at least impracticable, to provide a spray nozzle coupled by a flexible hose with the water supply to the nozzle, and the temperature of the water so supplied, being controlled by the taps of the pillar sink mixer in the same way as with other non pillar sink tap arrangements incorporating such spray nozzles.

It is an object of the present invention to provide a solution to the problem of providing a spray nozzle supplied with controlled quantities of hot and cold water by a flexible hose from a pillar sink mixer.

It is another object of the present invention to utilize a traditional form of a pillar sink mixer for aesthetic value and provide improved water mixing facilities to controllably vary the desired quantities of hot and cold water selectively supplied to each of two discharge nozzles.

SUMMARY OF PRESENT INVENTION

According to one aspect of the present invention there is provided a water mixer for a sink, the water mixer comprising a mixing chamber having a hot water inlet and a cold water inlet, a hot water tap for controlling a supply of water from a hot water source to the hot water inlet of the mixing chamber, a cold water tap for controlling a supply of water from a cold water source to the cold water inlet of the mixing chamber, a first outlet for discharging water from the mixing chamber, shuttle valve operative within the mixing chamber in a first position to cut off water flow from the mixing chamber to the first outlet and in a second position to permit water flow from the mixing chamber to the first outlet, a nozzle outlet for discharging water from the mixing chamber, and a nozzle including a valve having an open position causing water flow from the mixing chamber through the nozzle outlet to the nozzle producing a pressure differential within the mixing chamber across the shuttle valve biasing the latter into the first position cutting off fluid flow from the mixing chamber to the first outlet, the valve of the nozzle having a closed position producing a pressurization of water within the mixing chamber to displace the shuttle valve to the second position causing water flow to the first outlet.

According to a further aspect of the present invention there is provided a pillar sink mixer comprising a hot tap pillar and a cold tap pillar having internal passageways interconnected in spaced-apart relationship by a mixer conduit joined with a single nozzle for discharging water from the conduit, a mounting pedestal including an abutment surface on an upper end of each of the hot tap pillar and the cold tap pillar for supporting engagement with a mounting surface portion with the hollow mixer conduit and the upper end of each of the hot tap pillar and the cold tap pillar tap pillar residing above the mounting surface portion, a hot water valve operable at a lower end of the hot tap pillar by a spindle extending through the hot tap pillar to a tap handle at the upper end thereof alternatively to provide or to cut off a water flow connection with a first connector of a hot water source and a hot water connector located below a first water outlet connected with the internal passageway of the hot tap pillar, a cold water valve operable at a lower end of the cold tap pillar by a spindle extending through the cold tap pillar to a tap handle at the upper end thereof alternatively to provide or to cut off a water flow connection with a cold water source and a cold water connector located below a second water outlet connected with the internal passageway of the cold tap pillar, a hot water flow separator operatively coupled between the second hot water connector and the first water outlet for preventing a flow of hot water there between, a cold water flow separator operatively coupled between the cold water connector and the second water outlet for preventing a flow of cold water there between, a mixer including a mixing chamber interconnected by water conducting conduits to the hot water connector, the first water outlet, the cold water connector and the second water outlet for discharging water to the internal passageways of the hot tap pillar and the cold tap pillar, and a hand spray nozzle connected by a flexible hose to the mixing chamber for discharging water from the mixing chamber.

BRIEF DESCRIPTION OF THE DRAWINGS

These features and advantages as well as others will be more fully understood when the following description is read in light of the accompanying drawings in which.

DETAILED DESCRIPTION OF THE PREFERRED EMBODIMENT

Figure 1:
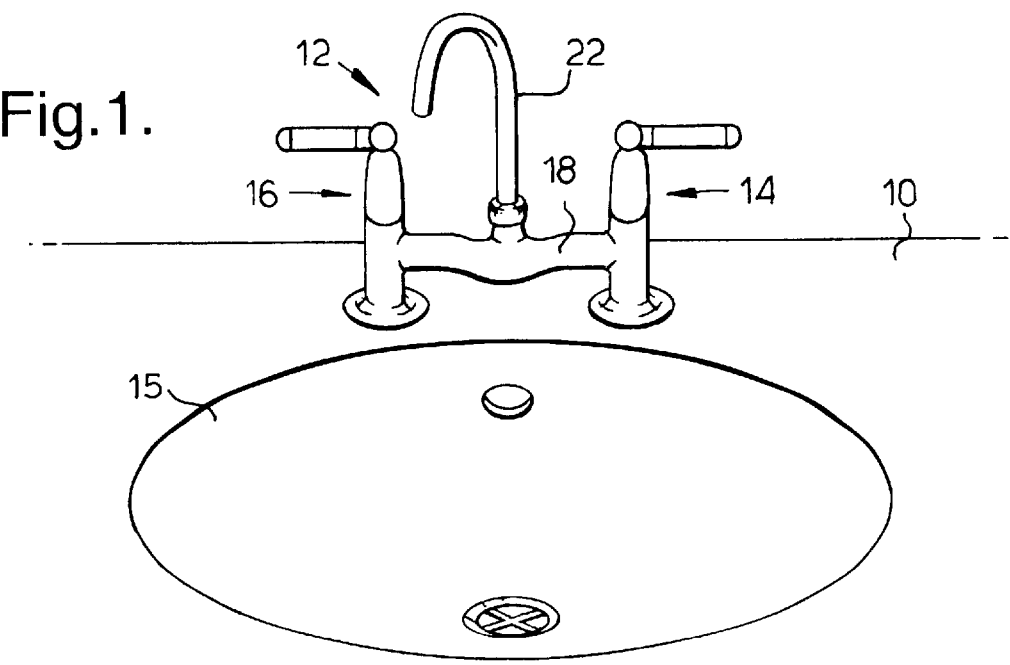
FIG. 1 is a schematic perspective view of a kitchen installation showing a portion of a conventional pillar sink mixer above the work surface.
Figure 2:
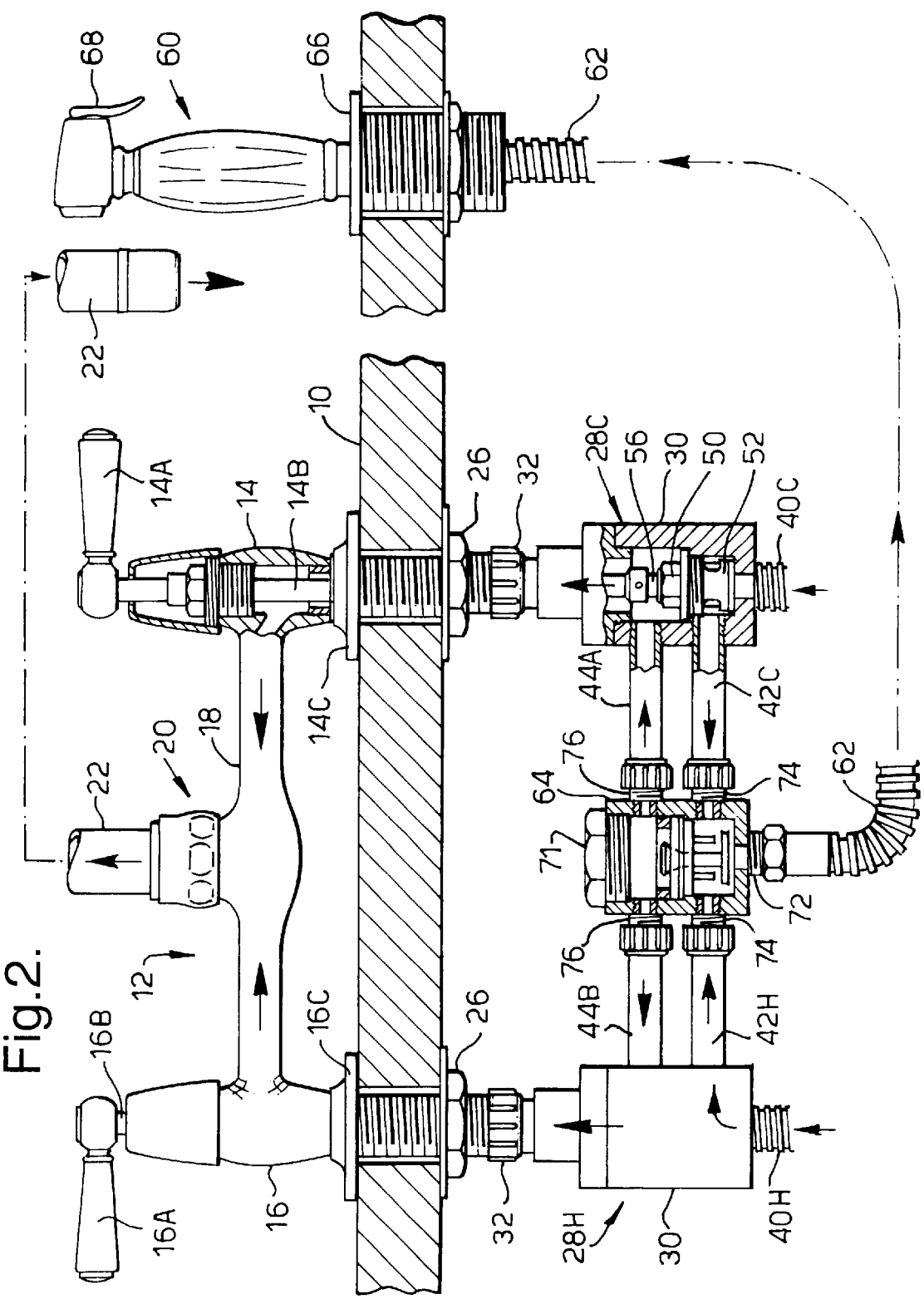
FIG. 2 is an elevational view, partly in section, of a kitchen installation incorporating a pillar sink mixer in accordance with the preferred embodiment of the present invention.

The preferred embodiment of the present invention utilizes that portion of a pillar sink mixer for aesthetic value and which is normally visible above a horizontal panel 10 and has the traditional appearance which is the same in the illustrations of FIGS. 1 and 2. In FIG. 2 parts corresponding to parts in FIG. 1 have the same reference numerals. Referring to FIGS. 1 and 2, as noted previously, reference numeral 10 indicates a horizontal panel which is in section in FIG. 2 and may typically be a horizontal flange of a sink assembly or a portion, adjoining a sink, of a slab providing a work surface in a kitchen. The pillar sink mixer 12 in accordance with the present invention and as shown in FIG. 2 includes a housing component of approximately "H" shape formed by horizontally spaced cold tap pillar 14 and a hot tap pillar 16 interconnected by a tubular horizontal mixer conduit 18. The conduit 18 has a fitting or union 20 midway between the pillars 14 and 16 from which there extends upwardly a vertical root portion of the outlet spout or swan-neck 22 (shown only partially in FIG. 2) and which is a conventional form, being, like its counterpart in FIG. 1, in the shape of an inverted "J" to provide, as with the arrangement in FIG. 1, a single downwardly-directed water outlet positioned over the sink. The arrangement may be such that the swan neck 22 can be pivoted about the vertical axis of the union 20, while maintaining a water tight seal between the swan-neck 22 and the remainder of the fitting. The cold tap pillar 14 and a hot tap pillar 16 are controlled by a respective lever 14A, 16A, by which a respective tap operating spindle 14B, 16B, extending vertically through the respective pillars 14 and 16 and may be turned to operate a respective water valve assemblies 28C and 28H.

The two pillars 14, 16 extend through respective vertical bores through the horizontal panel 10. The pillars 14, 16 have respective pedestals 14C, 16C, which engage the upper surface of the horizontal panel 10 and conceal the bores through which the portions of the pillars below the pedestals extend. In a manner known per se, the portions of the pillars extending below the pedestals are externally screw-threaded and receive conventional retaining nuts 26 which are screwed up so that the flange 10 is clamped between the pedestals 14C, 16C and the nuts 26.

In the arrangement shown in FIG. 2, the respective valve assemblies 28C and 28H are secured to the lower end of each of the pillars 14 and 16, respectively. Each of these valve assemblies incorporate a casing 30 releasable connected by a threaded union 32 with the lower end of the externally threaded lower part of the respective pillar. The casings 30 of the valve assemblies 28C and 28H are connected to: a cold water connector 40C and a hot water connector 40H, respectively; a cold water outlet 42C and a hot water outlet 42H; and a first inlet connector 44A and a second inlet connector 44B both at a higher elevation than the elevation of the cold water outlet 42C and the hot water outlet 42H. Each casing 30 accommodates a screw-down valve mechanism carried by a plug 50 which is screwed into a screw threaded counterbore in the respective casing 30, the mechanism including a screw-down valve member 52 below the plug 50. The plug 50 accommodates a valve operating mechanism, known per se, which includes a valve-operating stub shaft 56 extending axially and vertically upward through the plug 50, the shaft 56 being rotatable sealingly within the plug 50. A socket at the lower end of the respective operating spindle 14B, 16B, receives, non-rotatably with respect thereto, the upper end of the respective stub shaft 56, the operating spindle 14B, 16B being, of course, coaxial with the respective stub shaft 56. In each of the valve assemblies 28C and 28H, the plug 50, valve member 52, valve operating mechanism and shaft 56 thus, together with the lower part of the casing 30 function and operate when the spindle 14B or 16B and the respective stub shaft 56 are rotated in one direction to raise the valve member 52 from its valve seat (formed around the upper end of the bore through the inlet stub 40), so that a passage is opened for flow of water from the inlet 40 past the valve seat to the outlet 42. The space within the interior of the respective pillar 14, 16, above the plug 50 merely forms a conduit for water flow, and there is no direct connection between this conduit and the region below the plug 50 within the casing 30. In the preferred embodiment, the valve assemblies 28C and 28H (known per se) are such that valve members 52 are moved from their fully open to their fully closed positions in a quarter turn of the respective stub shafts 56 and corresponding handles 14A, 16A about their respective vertical axes, but it will be understood that other types of taps or water valves may be used.

The apparatus shown also includes a hand spray 60 which is connected by a flexible hose 62 with a mixer chamber 64, the hand spray 60, when not in use, resting within a socket 66 mounted, as shown, in an aperture in the flange or slab 10 so that when required the hand spray can be lifted from its socket to be directed at items to be cleaned. The hand spray 60 incorporates a water valve, in known fashion, operable by a thumb lever 68.

Figure 3:
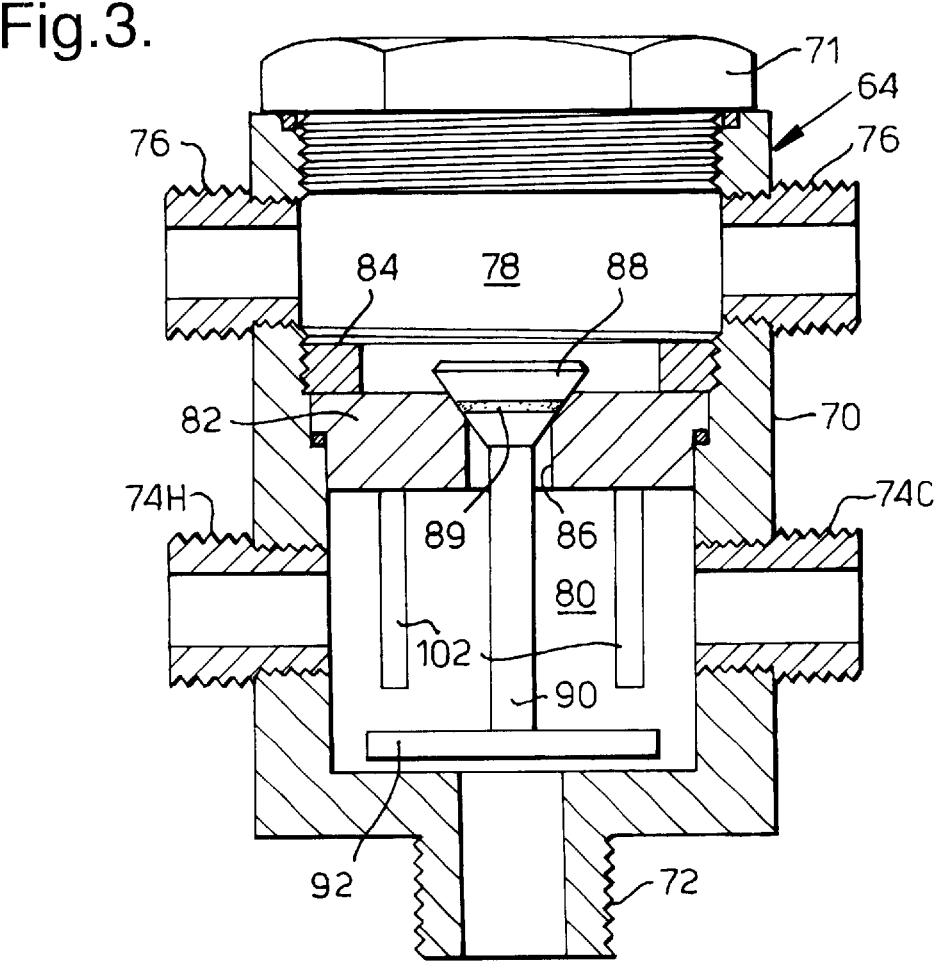
FIG. 3 is an enlarged sectional view of a shuttle valve forming part of the pillar sink mixer shown in FIG. 2.

Referring to FIGS. 2 and 3, the mixer chamber 64 comprises a generally cylindrical housing 70 having an outlet connector 72 at its lower end. The interior of housing 70 is divided into an upper chamber 78 and a lower chamber 80 by a shuttle valve 81 having valve seat member 82 which spans the interior of the housing 70 and is held in place by a retaining ring 84 screw-threadedly engaged with internal screw threading in an upper portion of the housing 70. The valve seat member 82 has a central passage 86 there through terminating, at its upper end, in a conical valve seat 87 which cooperates with a complementary truncated conical poppet valve head 88 having a stem 90 extending downwardly, through aperture 86 into the lower chamber 80 of the shuttle valve 81. The lower end of the stem 90 carries a horizontal circular plate 92 spaced slightly above the lower wall of the lower chamber 80 and in a position overlying the bore through the outlet connector 72 when the poppet valve head 88 is firmly engaged in a water tight relation with the valve seat member 87. As shown in FIG. 3, a sealing "O" ring 89 is seated in a grove formed in the conical surface of the poppet valve head 88. The upper end of housing 70 is closed by a screw cap 71. The mixer chamber has a first pair of cold and hot lateral inlets 74C and 74H, respectively, adjacent the lower end of the housing, connecting with the lower chamber 80, and a pair of lateral outlets 76 at a higher level than inlets 74C and 74H, connecting with the upper chamber 78. Abutment members 102 projecting downwardly from the body of the valve seat 87 limit upward movement of the valve and thus upward movement of the plate 92 away from the outlet through connector 72.

As shown in FIG. 2, the cold water outlet 42C and hot water outlet 42H of the valve assemblies 28C and 28H are connected to the respective ones of the inlets 74C and 74H, while the first inlet connector 44A and second inlet connector 44B of the valve assemblies 28C and 28H are connected to respective ones of the outlets 76 of the housing 70. When the valve 68 in the hand-spray 60 is not actuated, no water can flow to the hand-spray from the mixing chamber 64, because when if either or both of the valve assemblies 28C and 28H are open, the pressure of water entering the lower chamber 80 from the cold water outlet 42C and hot water outlet 42H, via the inlets 74, operates to lift the poppet valve head 88, stem 90 and plate 92 to allow the water to pass from the lower chamber 80 through the bore 86 into the upper chamber 78 and thence to the first inlet connector 44A and second inlet connector 44B via the outlet 76, from whence the water passes within the pillars 14 and 16 and through the horizontal limb 18 to the swan neck 22 for discharge to the sink. It will be understood that, in principle, whatever the positions of the taps 14A, 16A, any water flowing from chamber 78 will pass equally through both of the pillars 14, 16, and will be at the same temperature within both pillars. If, when either or both of the valve assemblies 28C and 28H is/are open, the thumboperated valve 68 on the spray head 60 is operated, the consequent pressure drop around the edges of the plate 92 as water flows from lower chamber 80 through the outlet connector 72 to the hand spray will produce a net force acting on the plate 92 so as to pull the poppet valve head 88 into engagement with valve seat 87 because the relative diameters of the plate 92 and the poppet valve head 88 are such as to ensure that the poppet valve head 88, stem 90 and plate 92 are moved into their lowermost position when the hand spray is operated. As a result of the arrangement described, when the spray is operated, the water supply to the swan-neck 22 is automatically cut off.

In the present specification "comprises" means "includes of or consists of" and "comprising" means "including or consisting of". The features disclosed in the foregoing description, or the following claims, or the accompanying drawings, express in their specific forms or in terms for performing the disclosed function, or a method or process for attaining the disclosed result, as appropriate, may, separately, or in any combination of such features, be utilized for realizing the invention in diverse forms thereof. While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A pillar sink mixer comprising:

a hot tap pillar and a cold tap pillar having internal passageways interconnected in spaced-apart relationship by a mixer conduit joined with a single nozzle for discharging water from the conduit;

a mounting pedestal including an abutment surface on an upper end of each of said hot tap pillar and said cold tap pillar for supporting engagement with a mounting surface portion with said hollow mixer conduit and the upper end of each of said hot tap pillar and said cold tap pillar tap pillar residing above the mounting surface portion;

a hot water valve operable at a lower end of said hot tap pillar by a spindle extending through said hot tap pillar to a tap handle at the upper end thereof alternatively to provide or to cut off a water flow connection with a first connector of a hot water source and a hot water connector located below a first water outlet connected with the internal passageway of said hot tap pillar;

a cold water valve operable at a lower end of said cold tap pillar by a spindle extending through said cold tap pillar to a tap handle at the upper end thereof alternatively to provide or to cut off a water flow connection with a cold water source and a cold water connector located below a second water outlet connected with the internal passageway of said cold tap pillar;

a hot water flow separator operatively coupled between said second hot water connector and said first water outlet for preventing a flow of hot water there between;

a cold water flow separator operatively coupled between said cold water connector and said second water outlet for preventing a flow of cold water there between;

a mixer including a mixing chamber interconnected by water conducting conduits to said hot water connector, said first water outlet, said cold water connector and said second water outlet for discharging water to the internal passageways of said hot tap pillar and said cold tap pillar; and a hand spray nozzle connected by a flexible hose to said mixing chamber for discharging water from said mixing chamber.

2. The water mixer according to claim 1 further including a shuttle valve operative within said mixing chamber in a first position to cut off water flow from said mixing chamber to said first water outlet and said second water outlet and in a second position to permit water flow from said mixing chamber to said first water outlet and said second water outlet.

3. The water mixer according to claim 2 further including a spray nozzle outlet for discharging water from said mixing chamber and wherein said hand spray nozzle includes a valve having an open position causing water flow from said mixing chamber through said spray nozzle outlet to said nozzle producing a pressure differential within the mixing chamber across said shuttle valve biasing the latter into said first position cutting off fluid flow from the mixing chamber to said first water outlet and said second water outlet, said valve of said nozzle having an closed position producing a pressurization of water within said mixing chamber to displace said shuttle valve to said second position causing water flow to said first water outlet and said second water outlet.

4. The water mixer according to claim 2 wherein said shuttle valve includes a poppet valve head joined with a plate in a spaced apart relation within said mixing chamber, said poppet valve head cooperation with a valve seat to define said first position and said second position to cut off and permit water flow respectively.

* * * * *